United States Patent [19]

Schauer

[11] 4,121,479
[45] Oct. 24, 1978

[54] POWER TRANSMISSION

[75] Inventor: George A. Schauer, Ames, Iowa

[73] Assignee: Sundstrand Corporation, Rockford, Ill.

[21] Appl. No.: 774,334

[22] Filed: Mar. 4, 1977

[51] Int. Cl.² .............................................. F16H 47/04
[52] U.S. Cl. ......................................... 74/687; 74/701
[58] Field of Search ................ 74/687, 694, 700, 701, 74/705

[56] References Cited

U.S. PATENT DOCUMENTS

| | | | |
|---|---|---|---|
| 2,241,764 | 5/1941 | Bollinger et al. | 74/700 X |
| 3,095,757 | 7/1963 | Thoma | 74/687 |
| 3,106,855 | 10/1963 | Reichenbaecher | 74/705 |
| 3,626,787 | 12/1971 | Singer | 74/687 |
| 3,763,718 | 10/1973 | Tipping | 74/705 X |
| 4,019,404 | 4/1977 | Schauer | 74/687 |

Primary Examiner—Samuel Scott
Assistant Examiner—Lance W. Chandler
Attorney, Agent, or Firm—Wegner, Stellman, McCord, Wiles & Wood

[57] ABSTRACT

A power transmission usable with a vehicle and having three ranges or speeds of operation in both forward and reverse directions of travel of the vehicle, including a low-speed range, an intermediate-speed work range, and a high-speed range and having a planetary differential with a sun gear drivingly connected to the motor of the hydrostatic transmission, a ring gear drivable either by the power input shaft or the hydrostatic transmission and a third intermediate planetary gear system connected to the output shaft with selectively operable clutches and gear trains related with the other structure of the power transmission for utilization in a drop box configuration and optional connection to multiple hydrostatic transmission pumps and motors.

16 Claims, 6 Drawing Figures

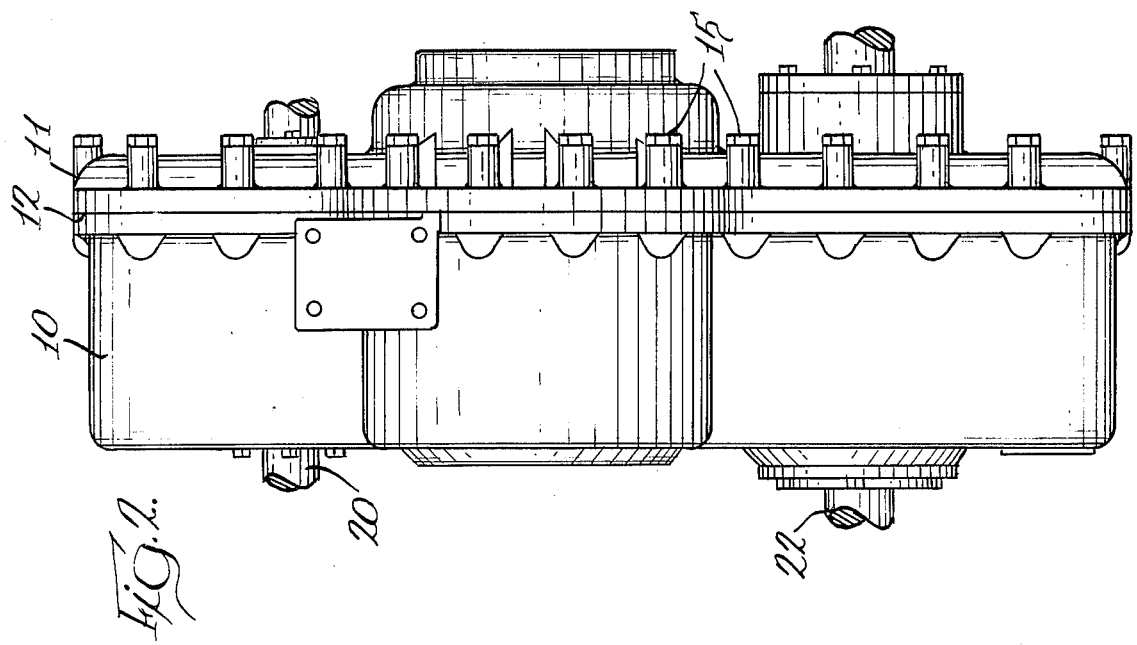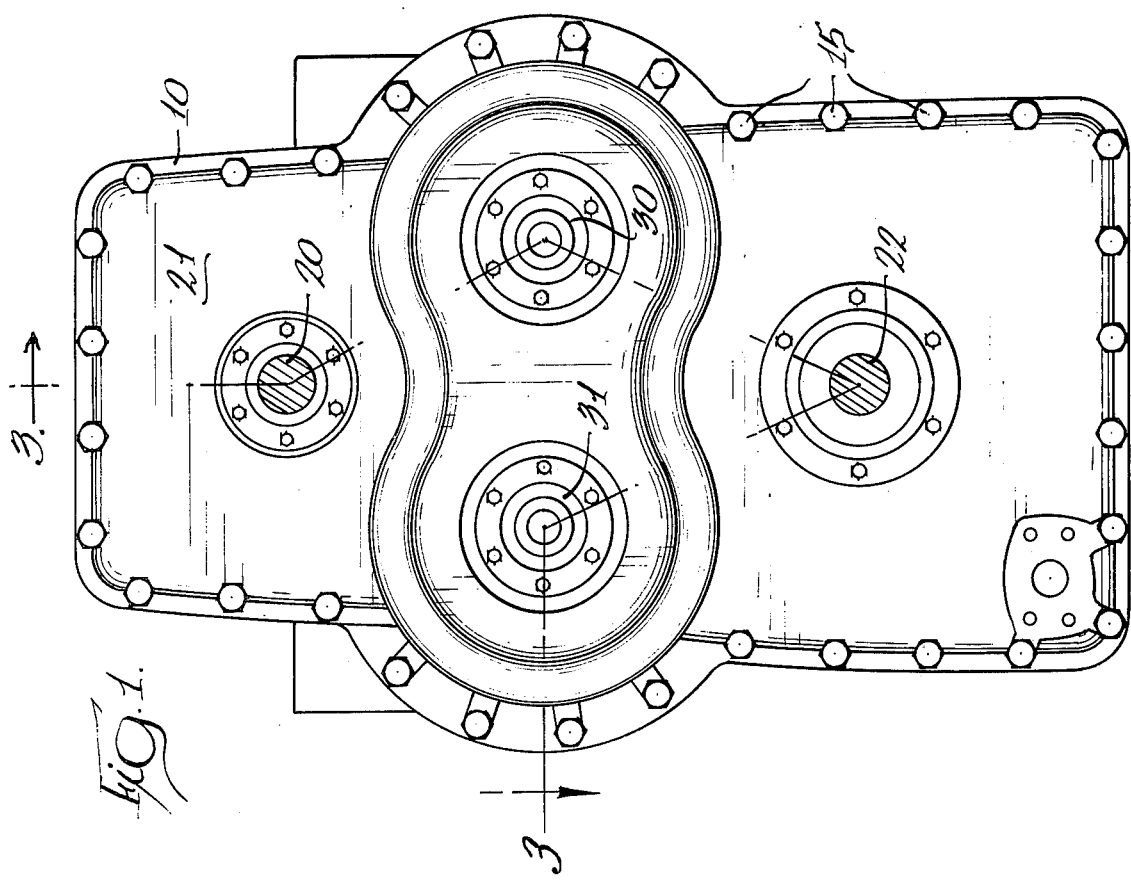

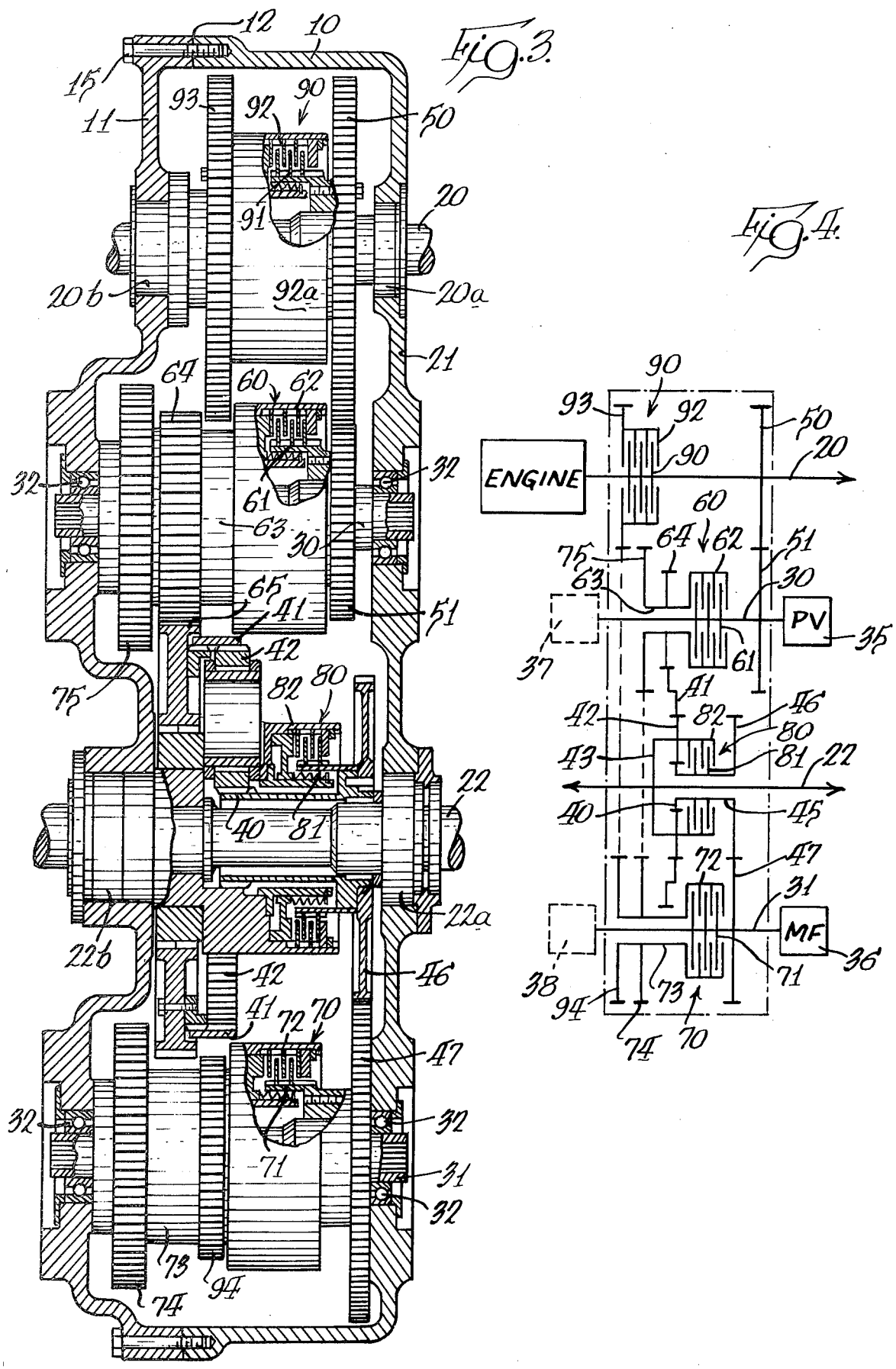

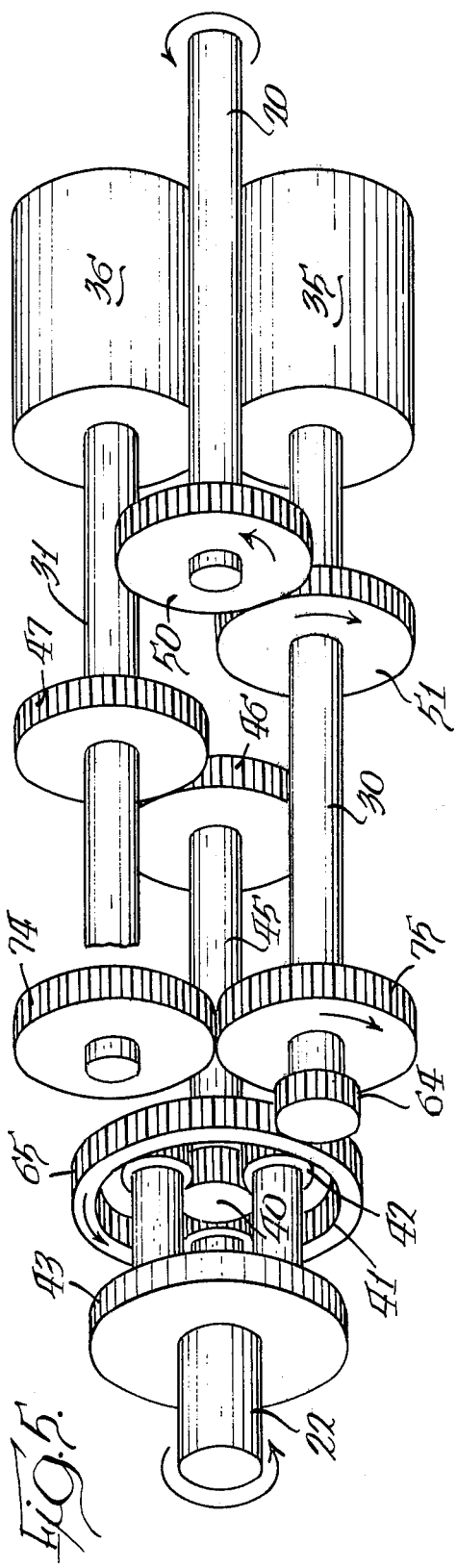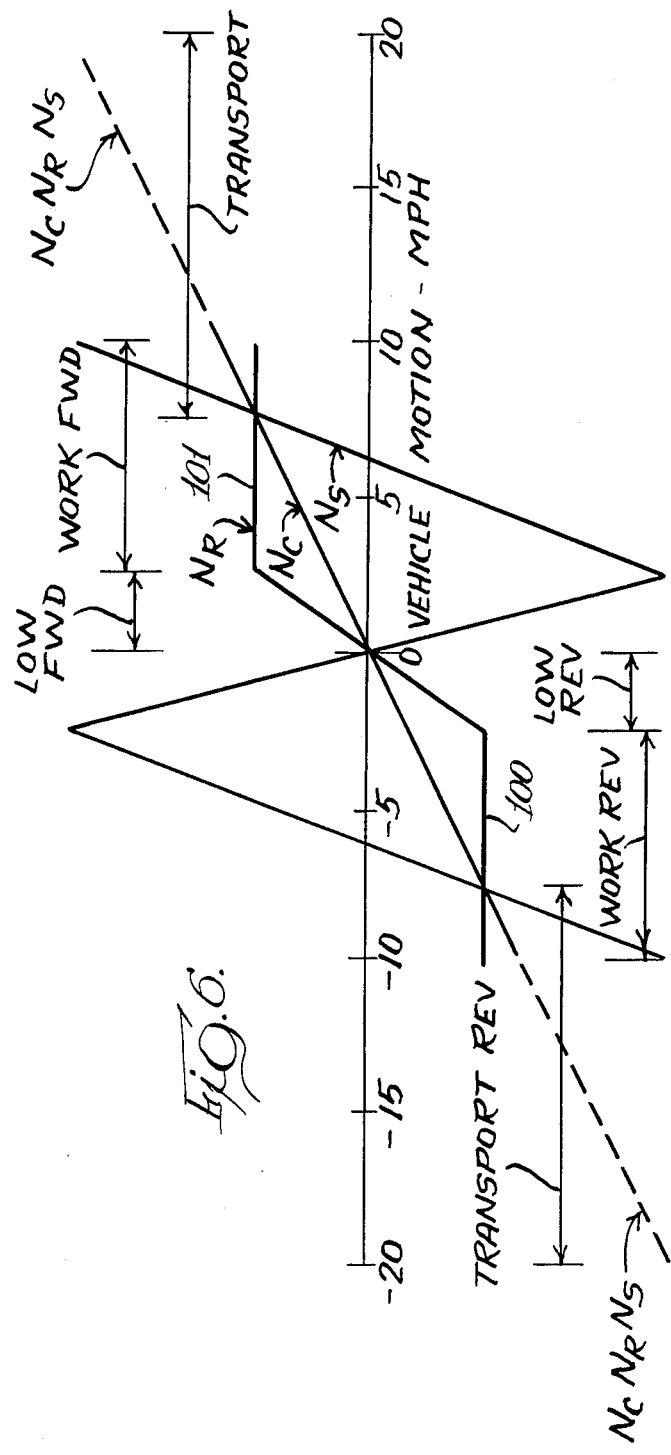

POWER TRANSMISSION

CROSS REFERENCE TO RELATED APPLICATION

This application discloses a power transmission embodying improvements in the type of power transmission disclosed in an application of this applicant, Ser. No. 560,998, filed Mar. 21, 1975, and the disclosure of this prior application is incorporated herein by reference.

BACKGROUND OF THE INVENTION

This invention pertains to a power transmission for vehicles, such as, farm and agricultural tractors, and has three ranges of operation in both forward and reverse directions of vehicle travel derived from a single planetary differential. A low-speed range and a high-speed transport range are provided by a variable speed hydraulic transmission input to the differential and an intermediate speed work range is by hydromechanical operation with inputs to the differential from both the hydraulic transmission and a mechanical drive. More specifically, the hydraulic transmission embodies a variable speed reversible hydrostatic transmission with a variable reversible displacement unit, such as a pump, and a fixed displacement unit, such as a motor.

A two-mode power transmission with a low-speed hydraulic range and a higher speed hydromechanical range is known in the art. The prior application of this applicant identified above has added a high-speed transport range by an additional hydraulic range of operation. Said prior application also broadly shows the use of a reverse gear and clutch to provide three modes of operation in forward and reverse and a drop box configuration for a power transmission. The prior art and applicant's prior application do not have a three-speed range transmission operable in both forward and reverse, with the capability of gear interchange for variable high-speed range, possible utilization of multiple pumps and motors of the hydrostatic transmission by connection to both ends of shafts of the transmission and various other features embodied in this disclosure.

SUMMARY OF THE INVENTION

A primary feature of the invention is to provide an improved, variable speed power transmission having an improved arrangement of elements permitting selected options usable individually or in combination including utilization in a drop box configuration, utilization in multi-range operation in both forward and reverse directions of rotation of an output shaft, and utilization of plural pump and motor units of a hydrostatic transmission.

More particularly, the power transmission has a planetary differential with the hydrostatic transmission at all times connected to one gear element thereof, such as the sun gear, and with another gear element, such as the ring gear, being alternately driven, either by the hydrostatic transmission in a hydrostatic mode of operation, or by a power source, in a hydromechanical mode of operation, and with the drive trains between the hydrostatic transmission and the elements of the planetary differential being arranged whereby a change of gearing to vary the top speed of the sun gear may be provided in order to give a variable high-speed range of drive and without any change in the drive of the ring gear by the hydrostatic transmission when in said hydrostatic mode.

Additionally, the structure of the power transmission is related to provide for a drop box configuration wherein the input shaft and output shaft of the power transmission are out of vertical alignment and with structural elements being related whereby the output shaft may extend outwardly from opposite faces of a casing housing the power transmission and the input shaft also may extend from opposite faces of the transmission casing with one end thereof being connectable to a power source, such as an engine, and the other end being usable as a power take-off shaft.

With a power transmission as defined in the preceding paragraphs, a pair of rotatable shafts are associated with elements of the transmission and extend outwardly of said elements at both ends thereof and have means at each end for connection of variable reversible displacement units, such as pumps, at each end of one shaft and motors at opposite ends of the other shaft whereby smaller pump and motor units may be used as parts of the power transmission and such smaller units being normally produced in quantities are cheaper and result in a lesser cost for the power transmission.

With the structural relation of the elements of the power transmission providing for different inputs to the planetary differential, it is possible to simply provide for full reverse direction of travel of the output shaft which would result in forward and reverse direction of travel of a vehicle using the power transmission. The basic elements provide for control of the variable displacement pump to provide forward and reverse operation in the hydrostatic modes at low speed and high speed and with an additional clutch and gear train providing for a reversed input to an element of the planetary differential from the input shaft when operating in the hydromechanical mode providing the intermediate speed work range in the reverse direction of operation.

BRIEF DESCRIPTION OF THE DRAWINGS

FIG. 1 is an end elevational view of the power transmission;

FIG. 2 is a side elevational view of the power transmission, with parts broken away;

FIG. 3 is a vertical sectional view on an enlarged scale, taken through shaft centers and generally along the line 3—3 in FIG. 1;

FIG. 4 is a schematic view of the power transmission;

FIG. 5 is a perspective view of certain basic drive elements of the power transmission; and FIG. 6 is a vehicle speed-element speed graph for the power transmission.

DESCRIPTION OF THE PREFERRED EMBODIMENT

The power transmission structure is shown generally in FIGS. 1 to 3 having a two-section casing with sections 10 and 11 being joined together along a line 12 and secured together with a series of fastening means 15 spaced around the perimeter of the casing sections. The power transmission is specifically disclosed as arranged for use as a drop box configuration, whereby the transmission may receive a power input at one level and deliver power at a lower level. A power input shaft 20 extends through supporting bearings 20a and 20b in the casing to have a part thereof extending out from a face 21 of the casing section 10 for connection to a power source, such as an engine, and has another part extending outwardly from a face of the casing section 11 to provide a power take-off section.

An output shaft 22 extends through supporting bearings 22a and 22b in the casing to have a part extending outwardly from the face 21 of the casing section 10 and another part extending outwardly from the face of the casing section 11. With this configuration, the power transmission can be associated with a vehicle and with the input shaft 20 connected to the engine and with the power output being delivered by the output shaft 22 at a lower level in the vehicle.

The power transmission utilizes a reversible variable speed hydrostatic transmission including a reversible variable displacement unit, such as a pump, and a fixed displacement unit, such as a motor, and with these components being connectable to a pair of rotatable shafts 30 and 31 rotatably journalled in bearings 32 mounted in each of the casing sections 10 and 11. These shafts open to the exterior of the casing at each end for mounting of hydrostatic transmission units to a single end or both ends of a shaft. As shown in the schematic view of FIG. 4, a pump unit 35 is mounted to an end of the shaft 30 and a motor unit is attached to an end of the rotatable shaft 31. The optional variation is shown in broken line with an added pump unit 37 connected to the other end of the rotatable shaft 30 and a motor unit 38 connected to the other end of the shaft 31.

The power transmission is shown schematically in FIG. 4 and part thereof diagrammatically in FIG. 5. The power transmission includes a planetary differential having a first gear 40 and a second gear 41 which, as shown in the preferred embodiment, are a sun gear and a ring gear, respectively, of the planetary differential. The third element of the planetary differential includes a series of third gears, in the form of planet gears 42, carried on a planet carrier 43 connected to the output shaft 22 of the power transmission.

The sun gear 40 is formed as part of a tubular member or sleeve 45 and rotatably journalled on the output shaft 22 whereby the output shaft can extend therethrough and the sun gear is in fixed drive connection with the rotatable shaft 31 mounting at least one transmission motor 36 by means of a gear train including a gear 46 fixed to the tubular member 45 and a gear 47 fixed to the shaft 31.

The rotatable shaft 30 is in fixed drive relation with the input shaft 20 through a gear train including a gear 50 on the input shaft 20 and a gear 51 on the rotatable shaft 30.

A first clutch, indicated generally at 60, has a series of clutch elements 61 fixed to the rotatable shaft 30 and a second series of clutch elements 62 fixed to a tubular member or sleeve 63 surrounding and rotatably journalled on the rotatable shaft 30. The sleeve 63 has a gear 64 in mesh with gear teeth 65 on the outer perimeter of the ring gear 41.

A second clutch, indicated generally at 70, has a series of clutch elements 71 fixed to the rotatable shaft 31 and a second series of clutch elements 72 secured to a tubular member or sleeve 73 journalled on the shaft 31 and having a gear 74 thereon which meshes with a gear 75 carried by the sleeve 63.

A third clutch, indicated generally at 80, has a series of clutch elements 81 connected to the sleeve 45 of the sun gear and a second series of elements 82 connected to the planet carrier 43.

A fourth clutch, indicated generally at 90, has a first series of clutch elements 91 fixed to the input shaft 20 and a second series of clutch elements 92 connected to a sleeve or tubular member 92a journalled on input shaft 20 and having a gear 93 fixed thereto which is in mesh with a gear 94 affixed to the sleeve 73 surrounding the rotatable shaft 31. The diagrammatic view of FIG. 5 does not show the clutches shown in FIGS. 3 and 4, nor the last-mentioned gear train.

The power transmission disclosed herein is usable with a vehicle to provide three ranges of operation in both forward and reverse directions of vehicle travel, including a low-speed range, wherein the drive is entirely hydrostatic through use of the hydrostatic transmission, an intermediate speed work range where the drive is hydromechanical with inputs to the planetary differential from both the input shaft and the hydrostatic transmission, and a higher speed transport range which is again hydrostatic by lockup of the planetary differential.

Referring to the vehicle speed-element speed graph of FIG. 6 and with the vehicle stationary, all three elements of the planetary differential are also stationary. For operation in the low-speed range forward direction, the clutch 70 is closed to have the hydrostatic transmission motor 36 drive the rotatable shaft 31 and rotate both the sun gear 40 and the ring gear 41. The rotation of the ring gear 41 is caused by engagement of the clutch 70 to rotate the sleeve 73 which drives the gear train having gears 74 and 75 to rotate the sleeve 63 and cause gear 64 thereon to rotate the ring gear. As shown in FIG. 6, the movement of the sun gear is identified by a line identified as $N_S$, with the movement of the ring gear being identified by a line identified as $N_R$, with resulting movement of the planetary carrier being identified by a line $N_C$. The low-speed forward range is indicated by an identified section on the graph from zero to approximately three miles per hour, with the ring gear reaching maximum speed.

The intermediate speed work range in forward is identified on the graph as being approximately 3 to 10 miles per hour. This range is accomplished by disengaging the clutch 70 and engaging the clutch 60. This shift in clutch engagement results in driving the ring gear 41 from the input shaft 20 through gear 64 carried by the sleeve 63 surrounding the rotatable shaft 30. At the beginning of the intermediate speed work range, the variable displacement pump unit 35, which may be of the type having a pivoted swash plate, has the swash plate at a fully-inclined position in one direction. The inclination of the swash plate is then changed toward neutral and at approximately mid-range of the intermediate speed work range the pump displacement is zero and opposite displacement of the pump unit causes a continuing increase in speed of the planetary carrier 43.

The higher speed transport range is identified on the speed graph and the lower part thereof is shown as overlapping the upper part of the intermediate speed work range. To go into the higher speed transport range, the clutch 60 is disengaged and the clutch 80 engaged. The engagement of clutch 80 results in connecting the sun gear 80 and the planetary gear system of the differential for rotation together and drive from the rotatable shaft 31. This lockup of the planetary differential is indicated by a broken line which represents a common speed for all three elements of the differential and is so identified.

In reverse direction of travel, the low-speed range and higher speed transport range are accomplished by engagement of clutches 70 and 80, respectively, in the same manner as described for forward direction of travel, but with opposite direction of movement of the swash plate of the variable displacement pump unit 35 for reversed direction of fluid flow to the fixed displacement motor unit 36. The above-described forward speed ranges and two reverse speed ranges are also disclosed in the aforesaid prior application of the applicant and the detailed description thereof is incorporated herein by reference. The prior application made general reference to the possibility of having an intermediate speed work range in a reverse direction of travel and a specific construction for accomplishing this disclosure is provided by the clutch 90 which functions as a reverse clutch. When operating in reverse and desiring to shift from the low reverse speed to the intermediate speed work range, the clutch 70 is disengaged and the clutch 90 is engaged. The engagement of clutch 90 results in the input shaft 20 driving sleeve 73 through the gear train having gears 93 and 94. Rotation of the sleeve 73 causes the rotation of the ring gear 41 through the gear train including the gears 74 and 75, with the latter gear being on the sleeve 63 and having the gear 64 in mesh with the ring gear. This action imparts a segment of ring rotation operation, indicated by a part 100 of the line $N_R$ which is a counterpart of the section 101 thereof in forward operation.

The higher speed transport range in reverse is indicated by a broken line, identified by the legend for all three elements of the planetary differential travelling at the same speed.

In a power transmission of this type, to get more torque, there is a recirculation of power through the hydrostatic transmission. Some power recirculation is inherent in any planetary. In the embodiment disclosed herein, in the low-speed range as the sun gear 40 increases speed indicated by the line $N_S$ in a direction below the speed line of FIG. 6, there is a recirculation of power from the sun gear 40 to the rotatable shaft 31 which is driven by the fixed displacement unit 36. In the lower part of the intermediate speed work range, there is recirculation of power from the sun gear 40 to the rotatable shaft 31 and back through the variable displacement unit 35 and the engaged clutch 60. When the sun gear 40 is at zero speed or no rotation, there is a straight-through power flow from the input shaft 20 to the output shaft 22 through the engaged clutch 60. In the highest part of the intermediate speed work range, there is no power recirculation, since the sun gear 40 and ring gear 41 are going in the same direction, with resulting increased speed and less torque. In the higher speed transport range, the planetary differential is locked up and there is no power recirculation.

In the higher speed transport range, in either forward or reverse direction of travel, the structure disclosed herein enables the selection of a variable high-speed range with corresponding change in torque capability of the power transmission. This is accomplished by separating the drive train from the rotatable shaft 31 to the sun gear 40 from the drive train from the rotatable shaft 31 to the ring gear 41. With the separate gear trains, it is possible to change the mesh of gears 46 and 47 which drive the sun gear from the rotatable shaft 31 to vary the top speed of the sun gear.

With the structure disclosed herein, it will be noted that there are no idlers or reverse-bending teeth for improved construction of the power transmission.

With the mechanical arrangement of the components in the drop box configuration, it will be seen that the rotatable shafts 30 and 31 are of a common construction for connection to the variable and fixed displacement units 35 and 36, respectively, for a reduction in the number of different parts required in the transmission. There is the capability of doubling-up on the use of fixed and variable displacement units so that each unit can be a smaller, high production item and, therefore, less costly. Additionally, the mechanical arrangement enables the output shaft to take off from either direction by the output shaft 22 extending out from both faces of the casing through the hollow sun gear. There is an easy power take-off capability from the input shaft 20. Also, the simplest possible route has been used for addition of a reverse drive train for providing the intermediate speed work range in a reverse direction of vehicle travel.

I claim:

1. A power transmission having three ranges of operation including a low-speed range, an intermediate-speed range and a high-speed range comprising: an input shaft; an output shaft; a planetary differential coaxial with said output shaft including a first gear, a second gear and a third intermediate gear connected to the output shaft; first and second rotatable spaced-apart shafts; a hydrostatic transmission with a pump connected to the first shaft and a motor connected to the second shaft; gear means connecting the input shaft to the first shaft; drive connecting means between said second shaft and the first gear; a first clutch and drive means having one clutch element connected to said first shaft and another clutch element connected to a first sleeve and gear means connecting said first sleeve to the second gear whereby clutch engagement drives the second gear from said first shaft in the intermediate-speed range; a second clutch and drive means having one clutch element on the second shaft and another clutch element connected to a second sleeve and gear means connecting said second sleeve to the first sleeve whereby engagement of the second clutch drives said second gear in the low-speed range; and third clutch means associated with said first gear and the third gear and engageable to lock up said differential for operation in the high-speed range.

2. A power transmission as defined in claim 1 including a fourth clutch and drive means including one clutch element on the input shaft and another clutch element carried by a sleeve and gear means connecting the last-mentioned sleeve to said second sleeve whereby engagement of the fourth clutch provides operation in reverse in the intermediate-speed range.

3. A power transmission having three ranges of operation including a low-speed range, an intermediate-speed work range and a high-speed range comprising: an output shaft; a planetary differential coaxial with said output shaft including a first gear, a second gear and a third intermediate gear connected to the output shaft; first and second rotatable spaced-apart shafts with the first shaft drivable by a power source; a hydrostatic transmission having a pump connected to the first shaft and a motor connected to the second shaft; a first gear train connected between said second shaft and the first gear; a first clutch and drive means having one clutch element connected to said first shaft and another clutch element connected to a first rotatable member and gear means connecting said first rotatable member to the second gear whereby clutch engagement drives the second gear from said first shaft in the work range; a second clutch and drive means having one clutch element on the second shaft and another clutch element connected to a second rotatable member and gear means connecting said second rotatable member to the first rotatable member whereby engagement of the second clutch drives said second gear in the low speed range; and third clutch means associated with said first gear and the third gear and engageable to lock up said differential for operation in the high speed range.

4. A power transmission as defined in claim 3 including an input shaft for receiving power from an engine or the like and said first rotatable shaft being offset therefrom and gearingly connected thereto.

5. A power transmission as defined in claim 3 wherein said power transmission is mounted in a casing and both of said rotatable shafts are open at both ends and exposed through the casing for connection of a pair of pumps to one shaft and a pair of motors to the other shaft.

6. A power transmission as defined in claim 5 wherein said input and output shafts are positioned in said casing one above the other and said rotatable shafts are arranged side-by-side at a level intermediate said input and output shafts.

7. A power transmission in a drop box configuration for a vehicle or the like having three ranges of operation including a low-speed range, an intermediate-speed work range and a higher speed transport range comprising: an input shaft connectable to a power source; an output shaft; a planetary differential coaxial with said output shaft including a sun gear, a ring gear and a third intermediate gear connected to the output shaft; first and second rotatable spaced-apart shafts open at both ends for connection of pump means to the ends of the first shaft and for connection of motor means to the ends of the second shaft, said pump and motor means being components of a hydrostatic transmission; gear means connecting the input shaft to the first shaft; a first gear train connected between said second shaft and the sun gear; a first clutch and drive means having one clutch element connected to said first shaft and another clutch element connected to a first sleeve and gear means connecting said first sleeve to the ring gear whereby clutch engagement drives the ring from said first shaft in the work speed range; a second clutch and drive means having one clutch element connected to the second shaft and another clutch element connected to a second sleeve and gear means connecting said second sleeve to the first sleeve whereby engagement of the second clutch drives said ring gear in the low-speed range; and third clutch means associated with said sun gear and the third gear and engageable to lock up said differential for operation in the transport range.

8. A power transmission usable with a vehicle to provide three ranges of operation in both forward and reverse directions of travel including a low-speed range, an intermediate-speed work range and a higher speed transport range comprising: an output shaft; a planetary differential coaxial with said output shaft including a first gear, a second gear and a third intermediate gear connected to the output shaft; first and second rotatable spaced-apart shafts with the first shaft drivable by a power source; a hydrostatic transmission having a pump connected to the first shaft and a motor connected to a second shaft; a first gear train connected between said second shaft and the first gear; a first clutch and drive means having one clutch element connected to said first shaft and another clutch element connected to a first sleeve and gear means connecting said first sleeve to the second gear whereby clutch engagement drives the second gear from said first shaft in the work speed range; a second clutch and drive means having one clutch element connected to the second shaft and another clutch element connected to a second sleeve and gear means connecting said second sleeve to the first sleeve whereby engagement of the second clutch drives said second gear in the low speed range; third clutch means associated with said first gear and the third gear and engageable to lock up said differential for operation in the transport range; and a fourth clutch and drive means including one clutch element drivable by the power source and another clutch element carried by a sleeve and gear means connecting the last-mentioned sleeve to said second sleeve whereby engagement of the fourth clutch provides operation in reverse in the work range.

9. A power transmission as defined in claim 8 wherein said power transmission is mounted in a casing and both of said rotatable shafts are open at both ends and exposed through the casing for connection of a pair of pumps to one shaft and a pair of motors to the other shaft.

10. A power transmission having three ranges of operation in both forward and reverse directions of operation of an output shaft including a low-speed range, an intermediate-speed work range and a high-speed range comprising: an output shaft; a planetary differential coaxial with said output shaft including a sun gear, a ring gear and a third intermediate gear connected to the output shaft; first and second rotatable spaced-apart shafts with the first shaft drivable by a power source; a hydrostatic transmission having a pump connected to the first shaft and a motor connected to the second shaft; drive connecting means between said second shaft and the sun gear; a first clutch and drive means having one clutch element connected to said first shaft and another clutch element connected to a first sleeve and gear means connecting said first sleeve to the ring gear whereby clutch engagement drives the ring gear from said first shaft in the work range; a second clutch and drive means having one clutch element connected to the second shaft and another clutch element connected to a second sleeve and gear means connecting said second sleeve to the first sleeve whereby engagement of the second clutch drives said ring gear in the low-speed range; third clutch means associated with said sun gear and the third gear and engageable to lock up said differential for operation in the high-speed range; and a fourth clutch and drive means including one clutch element drivable by the power source and another clutch element carried by a sleeve and gear means connecting the last-mentioned sleeve to said second sleeve whereby engagement of the fourth clutch provides operation in reverse in the work range.

11. A power transmission usable with a vehicle to provide three ranges of operation in both forward and reverse directions of travel including a low-speed range, an intermediate-speed work range and a higher speed transport range comprising: an input shaft; an output shaft; a planetary differential coaxial with said output shaft including a sun gear, a ring gear and a third intermediate gear connected to the output shaft; first and second rotatable spaced-apart shafts; a hydrostatic transmission having a pump connected to the first shaft and a motor connected to the second shaft; gear means connecting the input shaft to the first shaft; drive connecting means between said second shaft and the sun gear; a first clutch and drive means having one clutch element connected to said first shaft and another clutch element connected to a first rotatable member and gear means connecting said first rotatable member to the ring gear whereby clutch engagement drives the ring from said first shaft in the work-speed range; a second clutch and drive means having one clutch element connected to the second shaft and another clutch element connected to a second rotatable member and a gear means connecting said second rotatable member to the first rotatable member whereby engagement of the second clutch drives said ring gear in the low-speed range; third clutch means associated with said sun gear and the third gear and engageable to lock up said differential for operation in the transport range; and a fourth clutch and drive means including one clutch element on the input shaft and another clutch element carried by a rotatable member and gear means connecting the last-mentioned rotatable member to said second rotatable member whereby engagement of the fourth clutch provides operation in reverse in the work range.

12. A power transmission usable with a vehicle to provide three ranges of operation in both forward and reverse directions of travel of the vehicle including a low-speed range, an intermediate speed work-range and a higher speed transport range comprising: an input shaft; an output shaft; a planetary differential coaxial with said output shaft including a first gear, a second gear and a third intermediate gear connected to the output shaft; first and second rotatable spaced-apart shafts open at both ends for connection of pump means to the ends of the first shaft and for connection of motor means to the ends of the second shaft, said pump and motor means being components of a hydrostatic transmission; gear means connecting the input shaft to the first shaft; a first gear train connected between said second shaft and the first gear; a first clutch and drive means having one clutch element connected to said first shaft and another clutch element connected to a sleeve and gear means connecting said first sleeve to the second gear whereby clutch engagement drives the second gear from said first shaft in the workspeed range; a second clutch and drive means having one clutch element connected to the second shaft and another clutch element connected to a second sleeve and gear means connecting said second sleeve to the first sleeve whereby engagement of the second clutch drives said second gear in the low-speed range; third clutch means associated with said first gear and the intermediate gear and engageable to lock up said differential for operation in the transport range; and a fourth clutch and drive means including one clutch element on the input shaft and another clutch element carried by a sleeve and gear means connecting the last-mentioned sleeve to said second sleeve whereby engagement of the fourth clutch provides operation in reverse in the work range.

13. A power transmission as defined in claim 12 wherein said first gear is a sun gear and the second gear is a ring gear.

14. A power transmission as defined in claim 12 wherein said input and output shafts are positioned in a casing one above the other and said rotatable shafts are arranged side-by-side at a level intermediate said input and output shafts.

15. A power transmission in a drop box configuration usable for a vehicle and having three ranges of operation in both forward and reverse directions of vehicle travel including a low-speed range, an intermediate-speed work range and a higher speed transport range comprising: an input shaft; an output shaft; a planetary differential coaxial with said output shaft including a sun gear, a ring gear and a third intermediate gear connected to the output shaft; first and second rotatable spaced-apart shafts open at both ends for connection of pump means to the ends of the first shaft and for connection of motor means to the ends of the second shaft, said pump and motor means being components of a hydrostatic transmission; gear means connecting the input shaft to the first shaft; a first gear train connected between said second shaft and the sun gear; a first clutch and drive means having one clutch element connected to said first shaft and antoher clutch element connected to a first sleeve surrounding the first shaft and gear means connecting said first sleeve to the ring gear whereby clutch engagement drives the ring from said first shaft in the work-speed range; a second clutch and drive means having one clutch element connected to the second shaft and another clutch element connected to a second sleeve surrounding the second shaft and gear means connecting said second sleeve to the first sleeve whereby engsgement of the second clutch drives said ring gear in the low speed range; third clutch means associated with said sun gear and the third gear and engageable to lock up said differential for operation in the transport range; and a fourth clutch and drive means including one clutch element on the input shaft and another clutch element carried by a sleeve surrounding the input shaft and gear means connecting the last-mentioned sleeve to said second sleeve whereby engagement of the fourth clutch provides operation in reverse in the work range.

16. A power transmission as defined in claim 15 having a casing housing the components thereof with the input shaft extending outward from opposite faces of the casing, said sun gear being tubular, and said output shaft extending through the sun gear and outwardly from both faces of the casing.

* * * * *